United States Patent [19]

Husson

[11] 4,331,220
[45] May 25, 1982

[54] ELEVATOR SYSTEM

[75] Inventor: Alan L. Husson, Hackettstown, N.J.

[73] Assignee: Westinghouse Electric Corp., Pittsburgh, Pa.

[21] Appl. No.: 203,835

[22] Filed: Nov. 4, 1980

[51] Int. Cl.³ .............................................. B66B 1/30
[52] U.S. Cl. ................................................. 187/29 R
[58] Field of Search ......................................... 187/29

[56] References Cited

U.S. PATENT DOCUMENTS

| 3,747,710 | 7/1973 | Winkler | 187/29 |
| 3,774,729 | 11/1973 | Winkler | 187/29 |
| 4,130,184 | 12/1978 | Satoh et al. | 187/29 |
| 4,136,758 | 1/1979 | Tachino | 187/29 |
| 4,155,426 | 5/1979 | Booker, Jr. | 187/29 |
| 4,261,439 | 4/1981 | Husson | 187/29 |

Primary Examiner—J. V. Truhe
Assistant Examiner—W. E. Duncanson, Jr.
Attorney, Agent, or Firm—D. R. Lackey

[57] ABSTRACT

An elevator system including an elevator car, and control apparatus for controlling its speed, including a speed pattern generator. The speed pattern generator provides a running speed pattern, and a slowdown speed pattern, wherein the deceleration rate of the slowdown speed pattern may be different than the acceleration and deceleration rates of the running speed pattern. Bumpless transfer from the running speed pattern to the slowdown speed pattern is achieved by forcing the slowdown speed pattern to match the magnitude of the running speed pattern just prior to transfer, and by initiating transfer when the rate of change of the running speed pattern equals the rate of change to be followed by the slowdown speed pattern after it is no longer forced to match the magnitude of the running speed pattern.

10 Claims, 4 Drawing Figures

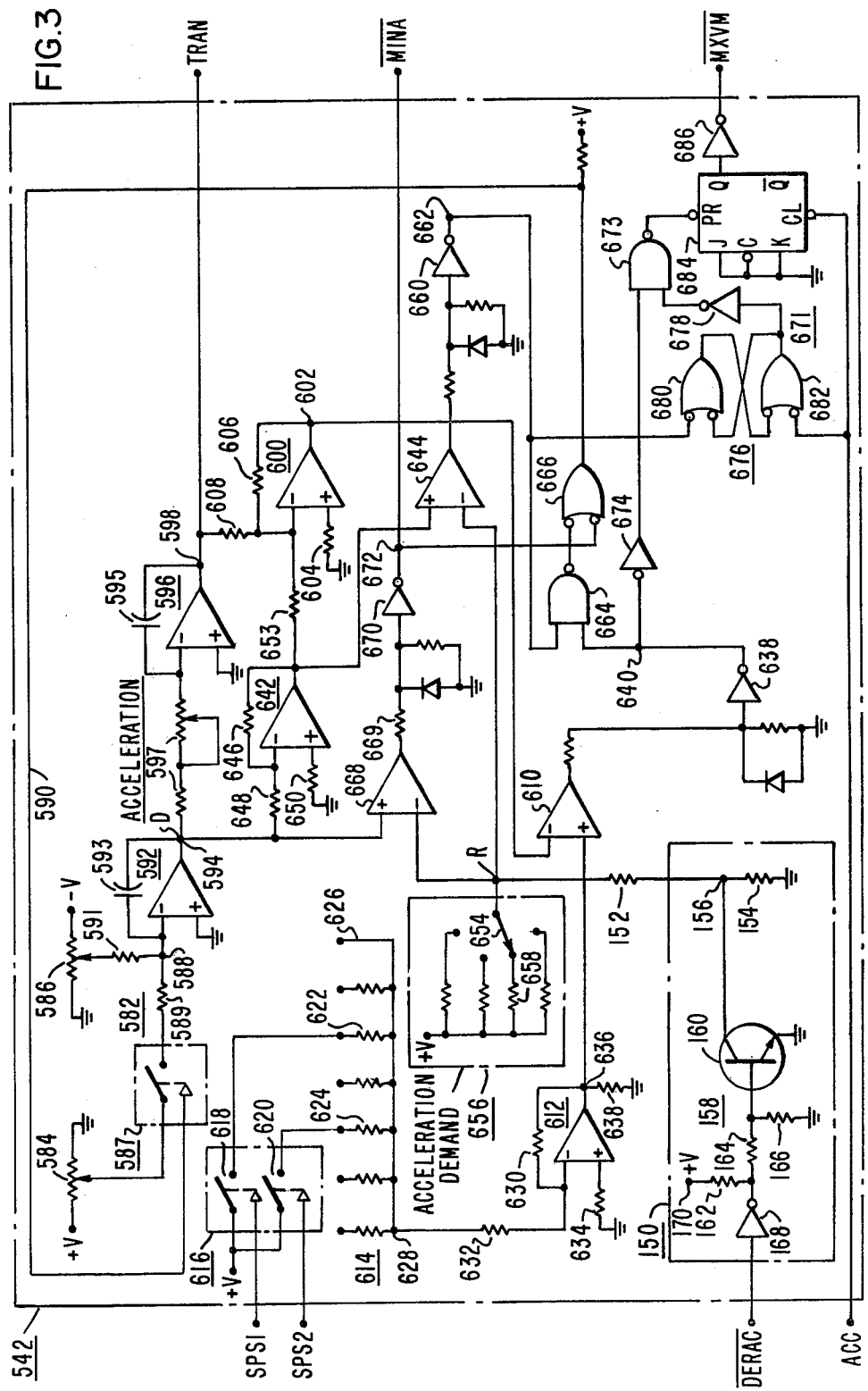

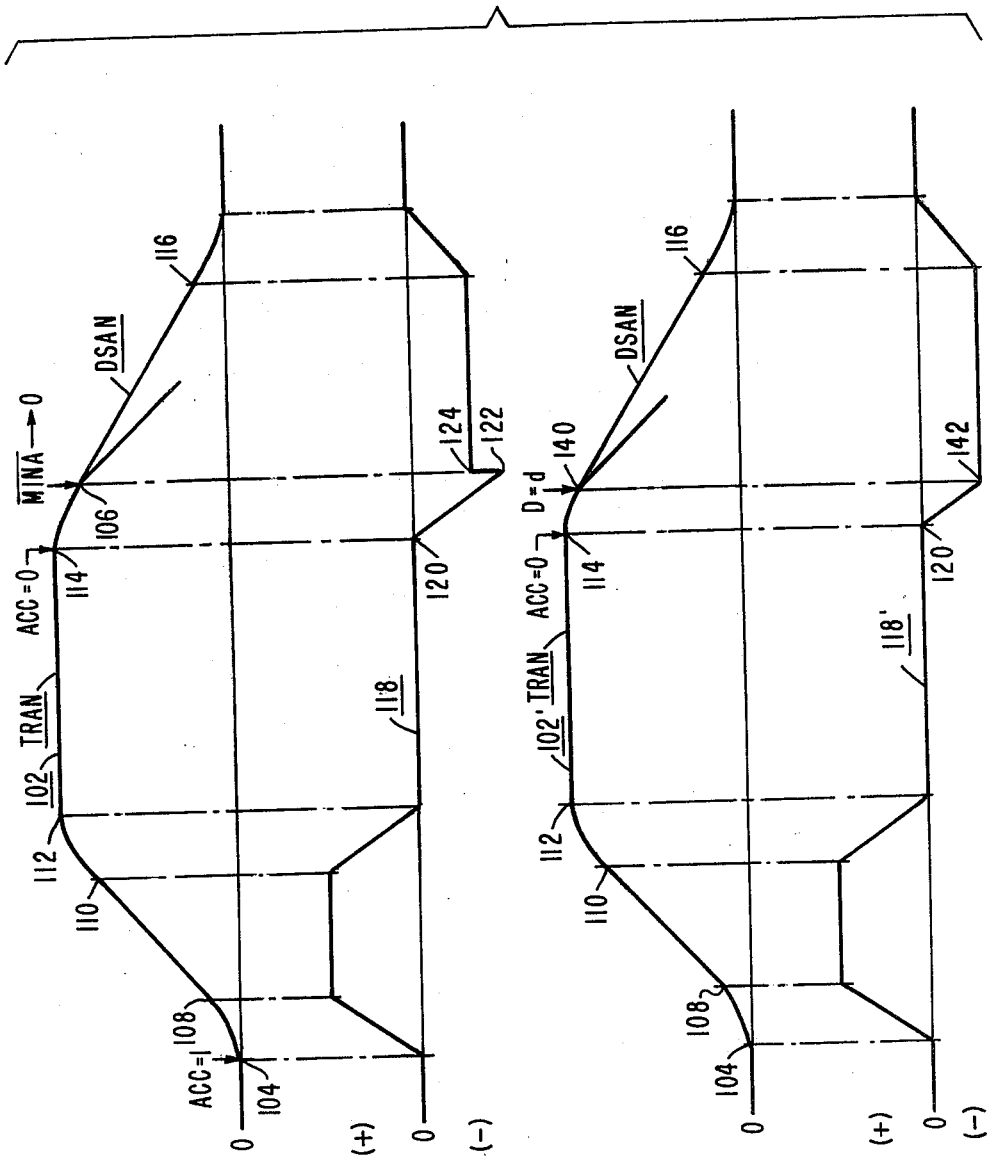

ELEVATOR SYSTEM

BACKGROUND OF THE INVENTION

1. Field of the Invention

The invention relates in general to elevator systems, and more specifically to elevator systems in which the speed of an elevator car is controlled by a speed pattern generator.

2. Description of the Prior Art

U.S. Pat. No. 3,774,729, which is assigned to the same assignee as the present application, discloses an elevator system in which a speed pattern generator controls the speed of an elevator car by providing a time based speed pattern which accelerates the elevator car to, and then maintains, a predetermined running speed. When the elevator reaches a predetermined position relative to a target floor, the speed pattern generator substitutes a distance based speed pattern for the time based pattern, to control the speed of the elevator car during the slowdown phase of the run.

In order to provide a high quality ride, without noticeable "bumps" in the elevator car during a run, the transfer from the time based or running speed pattern to the distance based slowdown speed pattern must be stepless, i.e., the patterns must match at transfer time. Further, in order to provide a comfortable ride, the slowdown must be made at a constant deceleration rate.

In the hereinbefore mentioned U.S. Patent, pattern transfer from the running speed pattern TRAN to the slowdown speed pattern DSAN is initiated after the running speed pattern has entered a slowdown phase, with transfer occurring when the running speed pattern reaches a preset maximum deceleration rate. Excellent performance is achieved when the pattern magnitudes match at the time of transfer, and the deceleration rate of the slowdown speed pattern is the same as the predetermined maximum deceleration value which was used to initiate pattern transfer.

In my co-pending application Ser. No. 073,822 filed Sept. 10, 1979 now U.S. Pat. No. 4,261,439, entitled "Elevator System" I disclosed an improvement for the elevator system of U.S. Pat. No. 3,774,729 in which the slowdown speed pattern DSAN is forced to match the running speed pattern TRAN prior to transfer between the speed patterns. Prior to pattern transfer, the invention of the co-pending application also automatically and continuously determines the deceleration rate to be used by the slowdown speed pattern after transfer, such that by freezing the deceleration rate at the value determined at the precise time of transfer, the elevator car will be decelerated at a constant rate, and the slowdown speed pattern will have a predetermined value when the elevator car is at a predetermined location relative to the target floor, enabling stepless transfer at this predetermined location from the slowdown speed pattern DSAN to a landing speed pattern HTAN which is initialized to the predetermined value.

The present invention is an improvement on my co-pending application, improving ride quality and eliminating bumps in the car during pattern transfer from the running speed pattern to the slowdown speed pattern, regardless of the deceleration rate which will be used by the slowdown speed pattern after pattern transfer.

SUMMARY OF THE INVENTION

Briefly, the present invention is a new and improved speed pattern controlled elevator system, which provides a smooth, bumpless transfer from a running speed pattern to a slowdown speed pattern by not only forcing the patterns to match in magnitude, but by also monitoring the rate of change of the running speed pattern and initiating pattern transfer when its rate of change, i.e., deceleration, has a predetermined relationship with the rate of change or deceleration which will be used by the slowdown speed pattern after transfer. In a preferred embodiment of the invention, this predetermined relationship is equality. Thus, pattern transfer is made not only when the pattern magnitudes are equal, but also when the slopes of the two speed pattern signals are equal, with pattern transfer occurring when the slowdown speed pattern is tangent to the changing slowdown portion of the curve which defines the running speed pattern.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 3 is a schematic diagram of a time dependent portion of the speed pattern generator shown in FIG. 2, modified according to the teachings of the invention; and FIG. 4 is a graph which sets forth certain speed and acceleration waveforms useful in describing the improved elevator system performance achievable by use of the invention.

DESCRIPTION OF THE PREFERRED EMBODIMENT

Figure 1:
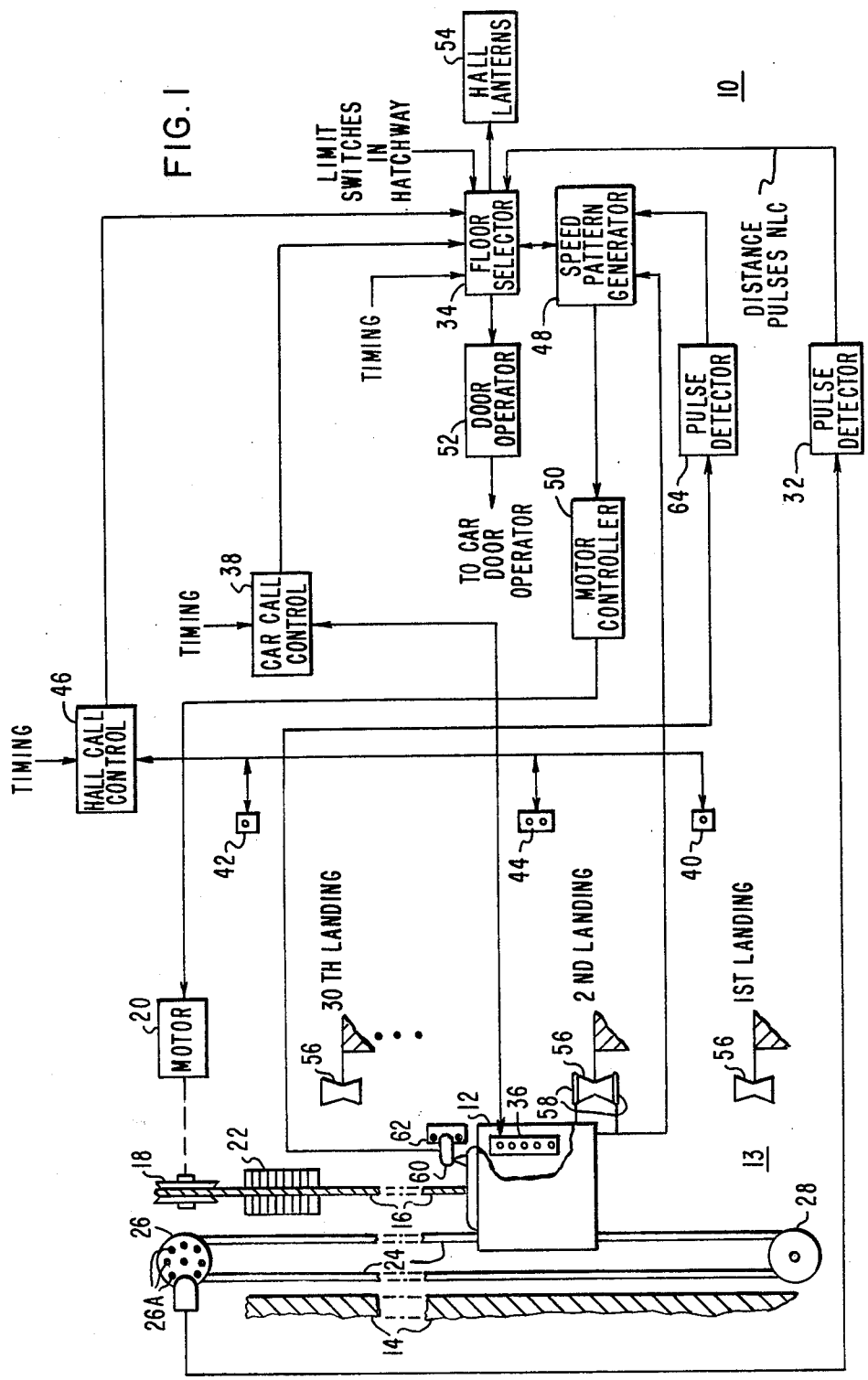
FIG. 1 is a partially schematic and partially block diagram illustrating an elevator system which may be constructed according to the teachings of the invention.
Figure 2:
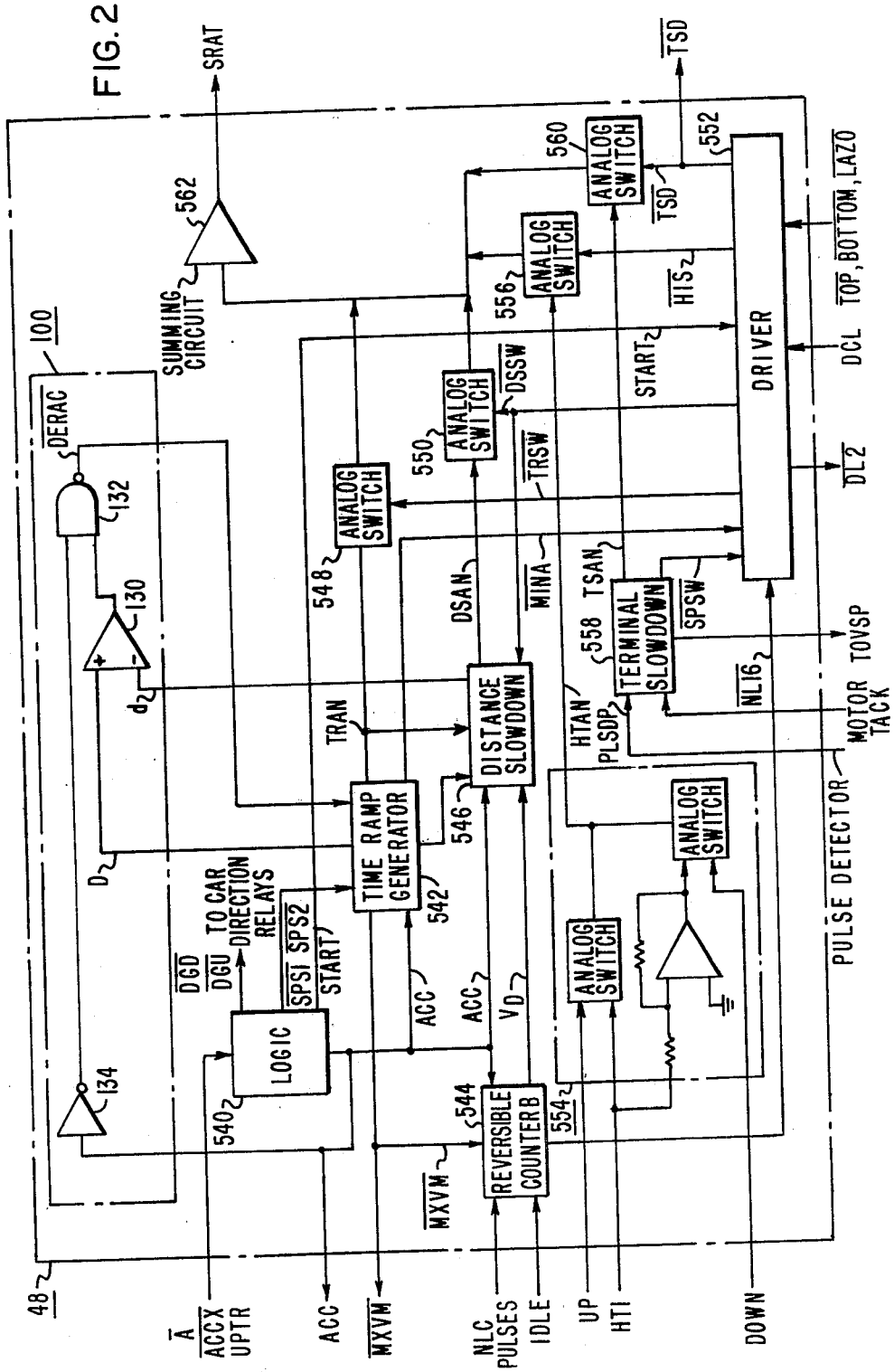
FIG. 2 is a schematic diagram of a speed pattern generator constructed according to the teachings of the invention, for use in the elevator system of FIG. 1.

The invention is a new and improved elevator system, and in order to reduce the complexity of the drawing and specification the hereinbefore mentioned U.S. Pat. No. 3,774,729, and my co-pending application Ser. No. 073,822 filed Sept. 10, 1979, are hereby incorporated into the present application by reference. The present invention will be described by illustrating how the elevator system of the incorporated patent would be modified to operate according to the teachings of the invention, and thus only the modifications thereto will be described in detail. FIG. 1 is the same as FIG. 1 of the incorporated patent, and is included to broadly show an elevator system of the type which may utilize the invention. FIG. 2 is similar to FIG. 2 of my incorporated application, except for the addition of a deceleration comparison function 100, to be hereinafter described. FIG. 3 is FIG. 14 of the incorporated patent modified to illustrate how the output of the deceleration function 100 may be used to initiate pattern transfer.

The reference numerals in FIGS. 1, 2 and 3 are the same as those in FIGS. 1, 12 and 14, respectively, of the incorporated patent, for ease of comparison.

Briefly, FIG. 1 illustrates an elevator system 10 wherein a car 12 is mounted in a hatchway 13 for movement relative to a structure 14 having a plurality of landings, such as thirty, with only the first, second and thirtieth landings being shown in order to simplify the drawing. The car 12 is supported by wire ropes 16 which are reeved over a traction sheave 18 mounted on the shaft of a drive motor 20, such as a direct current motor as used in the Ward-Leonard, or in a solid state, drive system. A counterweight 22 is connected to the other ends of the ropes 16. A governor rope 24, which is connected to the car 12, is reeved over a governor sheave 26 located above the highest point of travel of the car in the hatchway 13, and over a pulley 28 located at the bottom of the hatchway. A pickup 30 is disposed to detect movement of the car 12 through the effect of circumferentially spaced openings 26A in the governor sheave 26. The openings in the governor sheave are spaced to provide a pulse for each standard increment of travel of the car, such as a pulse for each 0.5 inch of car travel. Pickup 30, which may be of any suitable type, such as optical or magnetic, provides pulses in response to the movement of the openings 26A in the governor sheave. Pickup 30 is connected to a pulse detector 32 which provides distance pulses NLC for a floor selector 34. Distance pulses NLC may be developed in any other suitable manner, such as by pickup disposed on the car which cooperates with regularly spaced indicia in the hatchway.

Car calls, as registered by pushbutton array 36 mounted in the car 12, are recorded and serialized in car call control 38, and the resulting serialized car call information is directed to the floor selector 34. Hall calls, as registered by pushbuttons mounted in the hallways, such as the up pushbutton 40 located at the first landing, the down pushbutton 42 located at the thirtieth landing, and the up and down pushbuttons 44 located at the second and other intermediate landings, are recorded and serialized in hall call control 46. The resulting serialized hall call information is directed to the floor selector 34.

The floor selector 34 processes the distance pulses from pulse detector 32 to develop information concerning the position of the car 12 in the hatchway 13, and it also directs these processed distance pulses to a speed pattern generator 48 which generates a speed reference signal for a motor controller 50, which in turn provides the drive voltage for motor 20.

The floor selector 34 keeps track of the car 12, the calls for service for the car, it provides the request to accelerate signal to the speed pattern generator 48, and it provides the deceleration signal for the speed pattern generator 48. The deceleration signal is provided at the precise time required for the car to start the slowdown phase of the run to decelerate according to a predetermined deceleration schedule and stop at a predetermined target floor for which a call for service has been registered. The floor selector 34 also provides signals for controlling such auxiliary devices as the door operator 52 and the hall lanterns 54, and it controls the resetting of the car call and hall call controls when a car or corridor call has been serviced.

Landing, and leveling of the car at the landing, is accomplished by a hatch transducer system which utilizes inductor plates 56 disposed at each landing, and a transformer 58 disposed on the car 12.

The motor controller 50 includes a speed regulator responsive to the reference pattern provided by the speed pattern generator 48. The speed control may be derived from a comparison of the actual speed of the motor and that called for by the reference pattern.

An overspeed condition near either the upper or lower terminal is detected by the combination of a pickup 60 and slowdown blades, such as a slowdown blade 62.

FIG. 2 is a schematic diagram of a speed pattern generator which may be used for the speed pattern generator 48 shown in FIG. 1. The speed pattern generator 48 provides a signal for the motor controller 50 which controls the speed of the drive motor 20, and thus the movement of the car 12. In elevator systems, the speed and position of the car must be precisely controlled for the safety and comfort of the passengers, while being responsive to calls for service at any time.

The speed pattern generator 48 receives signals ACCX and UPTR from the floor selector 34, responsive to a request for acceleration, and travel direction request, respectively, which signals are processed in logic circuit 540 to provide signals DGU and DGD for the car direction relays, acceleration signal ACC, speed signals SPS1 or SPS2 for a time based running speed pattern generator circuit 542, and a start signal START for a driver circuit 552. The running speed pattern generator 542 provides a time dependent signal TRAN which is used for the acceleration, full speed and transition between full speed and maximum deceleration phases of the run, with the speed pattern generator 48 automatically switching to distance based slowdown speed patterns DSAN and HTAN for the maximum deceleration and landing phases of the run, respectively.

A reversible counter 544 receives the distance pulses NLC. Counter 544 is responsive to signal MXVM from the running speed pattern generator 542, which goes to logic ZERO when maximum speed of the car is reached, and signal ACC goes to the logic ZERO level when deceleration is requested. These signals program counter 544 to (a) count up in response to the NLC distance pulses while the car is accelerated, to (b) stop counting when the car reaches maximum speed (MXVM goes to ZERO), which thus stores the distance to go to a landing, and to (c) count down when the deceleration is initiated (ACC goes to ZERO).

The output of counter 544 is applied to a distance based slowdown circuit 546, which provides a speed reference signal DSAN. The switching from the time dependent running pattern signal TRAN to the distance dependent slowdown pattern signal DSAN is accomplished by switches 548 and 550 and a driver circuit 552 which provides switching signals TRSW and DSSW at the proper time for operating analog switches 548 and 550, respectively. Signal DSSW is also applied to the slowdown pattern generator 542 to freeze a deceleration signal related to a self-adjusting feature at its value at the time of the transfer or switch from the running to the slowdown speed patterns. The running pattern TRAN is also applied to the slowdown pattern generator 546, in order to enable a comparison.

When the car is within a predetermined distance from the target floor at which it is to stop, such as 10 inches, a signal HT1 from a hatch transducer is applied to a switching arrangement 554, which is also responsive to the car travel direction, signals UP and DOWN. Signal UP is true when the car is traveling upwardly, and signal DOWN is true when the car is traveling downwardly. Switching arrangement 554 provides a speed reference signal HTAN for an analog switch 556, which receives a switching signal HIS from driver 552 at the proper time to switch from the slowdown speed reference signal DSAN to the hatch transducer speed reference signal HTAN.

The pulse detector 64 shown in FIG. 1 generates pulses in response to pickup 60 on the elevator car and slowdown blades 62 mounted in the hatch near the terminals. These pulses, referred to as PLSDP pulses, along with a signal from a tachometer on the drive motor 20, are applied to a terminal slowdown circuit 558. Terminal slowdown circuit 558 detects car overspeed near a terminal, and when overspeed is detected, it provides a speed reference signal TSAN for stopping the car at the terminal the car is approaching. Signal TSAN is switched into circuit effect by analog switch 560, which receives a switching signal TSD from drive 552. If the overspeed condition detected by terminal slowdown circuit 558 exceeds a predetermined magnitude, a signal TOVSP is generated which is applied to emergency stopping control (not shown), which may be conventional.

The signals from the analog switches driven by the driver 552 are applied to a summing amplifier 562, which provides a speed reference signal SRAT for the motor controller 50, shown in FIG. 1, which may be conventional.

As described in detail in my incorporated application, the slowdown speed pattern generator 546 automatically forces the slowdown speed signal DSAN to match the value of the running speed pattern TRAN at transfer, in an attempt to smooth the transition and to remove the criticality as to exactly when switching occurs. Also, it automatically selects the correct constant deceleration rate d to be used in developing the slowdown speed pattern DSAN after the pattern transfer in order to arrive at the initial value of the hatch transducer pattern HTAN precisely at the transfer point, to assure a smooth, bumpless landing.

A binary count, stored in counter 544 represents the distance of the elevator car from the target floor, and this count is changed to an analog voltage signal $V_D$. When the elevator car is to stop at a selected target floor, signal ACC goes low precisely when the elevator car reaches the distance from the target floor which corresponds to the binary count already in the counter. The counter then starts counting down in response to the distance pulses NLC, when signal ACC goes low. Broadly, the slowdown speed pattern generator 546 takes the square root of the distance-to-go signal $V_D$ to develop the speed pattern DSAN. Transfer from the running speed pattern TRAN to the slowdown speed pattern DSAN, however, is not made at this time. When signal ACC goes low, the running speed pattern TRAN starts a transition phase, with the transfer to the slowdown speed pattern normally being made at the end of this transition phase, i.e. when a predetermined maximum deceleration rate is achieved.

The invention of my incorporated application compares the running speed pattern TRAN with the slowdown speed pattern DSAN when signal ACC goes low and DSAN is initiated, with the comparison persisting up to the signal transfer point. This comparison circuit develops a deceleration signal d for the circuitry which processes the distance signal $V_D$, adjusting the deceleration signal d as required to cause the magnitude of the slowdown speed pattern DSAN to start at the magnitude of the running speed pattern at the time of pattern transfer and cause the car to decelerate at a constant rate, with the slowdown speed pattern DSAN matching the landing pattern HTAN at the 10 inch transfer point.

While it was found that the arrangement of my co-pending application provided smooth transfer from the slowdown speed pattern to the hatch transducer pattern, a slight "bump" may still occur during the transfer from the running speed pattern to the slowdown speed pattern. I have found that this slight bump is due to the fact that pattern transfer is responsive to the running speed pattern reaching a predetermined preset maximum deceleration value. Curve 102 in FIG. 4 represents the composite speed pattern, with the running speed pattern starting at point 104 when signal ACC goes high, and continuing to point 106 where signal MINA goes low to signify that the maximum predetermined deceleration rate has been achieved. The speed pattern increases its rate of change from point 104 to point 108 and then maintains a predetermined constant acceleration rate to point 110. The constant rate of change is reduced to zero and thus to a constant velocity from point 110 to point 112, and the constant velocity is maintained until the elevator car reaches a predetermined distance from the target floor, signified by signal ACC going low at point 114. The magnitude of the speed pattern then starts reducing, with a rate of change or deceleration rate which increases from point 114 to point 106, at which time the maximum predetermined deceleration rate is achieved and signal MINA goes low to signify this fact. The slowdown speed pattern then decelerates the elevator car with a constant deceleration rate from point 106 to point 116, at which point transfer is made to the hatch transducer pattern HTAN. The maximum deceleration rate at which pattern transfer is made at point 106 may not be the same as the constant deceleration rate of the slowdown speed pattern. In some systems, it may be deliberately selected to be less than the absolute magnitude of the acceleration rate, in order to improve landing performance, for example. In the system of my co-pending application, a deceleration rate is selected during each run of the elevator car by forcing the slowdown pattern to have the same magnitude as the running pattern at the time of pattern transfer. This deceleration rate, which is held constant after pattern transfer, will cause the slowdown pattern to match the magnitude of the hatch transducer pattern at the landing transfer point. Thus, as shown in curve 118 in FIG. 4, which is a curve of the rate of change or acceleration of the speed pattern 102, the deceleration rate increases from zero at point 120 to the predetermined maximum value at point 122. If the deceleration rate of the slowdown pattern is less than that at point 122, it will drop to point 124 causing a slight bump to be felt in the car as the car deceleration rate changes, notwithstanding equal pattern magnitudes at the time of pattern transfer.

The present invention recognizes that in addition to causing the magnitude of the slowdown speed pattern to start at the same magnitude as the running speed pattern at the time of pattern transfer, that the patern transfer point should not be fixed, but should be controlled such that pattern transfer occurs precisely at the point where the increasing deceleration rate of the running speed pattern equals the deceleration rate which the slowdown speed pattern will follow after pattern transfer. The slowdown speed pattern will thus be tangent to the running speed pattern curve during its transition towards a predetermined maximum deceleration rate. Transferring between patterns at this precise point in time provides an absolutely smooth pattern transfer with no steps in the deceleration pattern.

An exemplary implementation of the present invention is set forth in FIG. 2, with the portion of the circuit within broken outline 100, which is deceleration comparison circuit, indicating the modification which may be made to my incorporated co-pending application. The deceleration rate of the time based running speed pattern TRAN, hereinafter referred to as signal D, is provided from the time ramp generator 542 shown in FIG. 3. This deceleration rate signal D is available as an analog signal at point 594 in FIG. 3, which is FIG. 14 of the incorporated U.S. Pat. No. 3,774,729. The continuously adjusted deceleration rate which will be frozen at the time of pattern transfer and used by the slowdown speed pattern generator, hereinafter referred to as signal d, is provided by the distance slowdown pattern generator 546. This deceleration rate signal d is available as an analog signal at the output of diode 128 in FIG. 3 of my incorporated co-pending application. These two deceleration rates, D and d, are compared in a comparator 130 such as an operational amplifier (LM311, for example), with signal D being applied to the non-inverting input, and signal d to the inverting input. When the deceleration rate D of the running speed pattern generator increases to the point where it equals the present value of d, the output of comparator 130 will switch positive. To assure that the elevator system is indeed in the slowdown mode before the positive output of comparator 132 is used to initiate pattern transfer, the output of comparator 130 is applied to one input of a dual input NAND gate 132. Signal ACC is applied to the other input via an inverter gate 134. Thus, if the elevator system is in the slowdown phase, signal ACC will be low and inverter gate 134 will apply an enabling logic one signal to NAND gate 132. When the output of comparator 130 goes high, the output of the enabled NAND gate 132 will go low, which change in signal level may be used to initiate pattern transfer. The output of NAND gate 132 provides a signal DERAC.

In order to use the circuitry already available in the incorporated patent to initiate pattern transfer, the following change may be made. Signal MINA normally goes low to initiate pattern transfer when the desired deceleration rate is reached. A comparator 668 in FIG. 3 compares the rate of change of deceleration rate D of the running speed pattern TRAN with a reference R. Reference R selects the desired maximum deceleration rate. The modification to FIG. 14 of the incorporated patent, set forth within block 150 of FIG. 3 of the present application, utilizes the changes in logic level of signal DERAC to reduce the magnitude of reference R to a value below where the magnitude of the deceleration rate signal D should be at this point in time, to thus cause signal MINA to go low when signals DERAC goes low. This arrangement of using signal DERAC has certain advantages, as it insures that signal TRAN has reached at least the selected reduced values of deceleration before pattern transfer is initiated, in the event of a malfunction which causes signal DERAC to go low prematurely. It also insures that transfer will occur at the normal maximum deceleration rate, should signal DERAC fail to go low before the normal maximum deceleration rate is reached.

The change in the level of reference R may be implemented, as illustrated in FIG. 3, by replacing the normal resistor connected from the inverting input of comparator 668 to ground with first and second serially connected resistors 152 and 154. Resistor 152 and 154 are interconnected at junction 156. Their values are chosen to provide the desired drop in magnitude of reference R when resistor 154 is removed from a voltage divider circuit which includes a resistor in the acceleration demand selector circuit 656. A solid state switching arrangement 158 is connected to short resistor 154 when signal DERAC goes low. Solid state switching arrangement 158, for example, may include an NPN transistor 160, resistors 162, 164, and 166, and an inverter gate 168. Resistors 162, 164 and 166 are serially connected from a source 170 of unidirectional potential to ground, with the base of transistor 160 being connected to the junction between resistors 164 and 166. Its collector is connected to junction 156, and its emitter is connected to ground. Signal DERAC is applied to the input of inverter gate 168, and its output is connected to the junction between resistors 162 and 164. Thus, when signal DERAC is high, the output of inverter gate 168 is low, transistor 160 is cut off, and resistor 154 is operatively connected in the voltage divider circuit which determines th magnitude of the reference voltage R applied to comparator 668. When signal DERAC goes low when the deceleration rates D and d are equal, the output of inverter gate 168 goes high to turn transistor 160 on and effectively remove resistor 154 from the voltage divider circuit, reducing the voltage to ground applied to comparator 668. If the actual deceleration rate D is already greater than this reduced value of R, as it normally will be, the output of comparator 668 will switch low and provide a true signal MINA initiating pattern transfer.

Curve 102' in FIG. 4 illustrates a composite speed pattern which incorporates the teachings of the invention. Pattern transfer occurs earlier than in curve 102, at point 140. It will be noted that the slowdown speed pattern curve from point 140 to point 116 is tangent to the changing curve of the running speed pattern, with pattern transfer occurring precisely at this tangent point. Thus, as shown in the acceleration curve 118', there is no abrupt change in deceleration rate, with the deceleration rate increasing from point 120 to the deceleration rate of the slowdown speed pattern at point 142.

In summary, there has been disclosed a new and improved elevator system having an improved performance, as pattern transfer from a time based speed pattern to a distance based speed pattern may be smoothly made without a noticeable change in speed or deceleration, regardless of a difference in the deceleration rates of the two speed patterns. Further, the automatically adjustable, and thus adaptable, deceleration rate arrangement of my co-pending application may be used, to achieve smooth pattern transfer from the running speed pattern to the slowdown speed pattern, and from the slowdown speed pattern to the landing speed pattern.

I claim as my invention:
1. An elevator system, comprising:
a structure having a plurality of floors,
an elevator car mounted for movement in said structure to serve the floors,
motive means for causing said elevator car to make a run and stop at a target floor,
and control means for said motive means, including speed pattern means for providing a speed pattern indicative of the desired speed of the elevator car during at least a portion of a run,
said speed pattern means including means providing a running speed pattern which increases its rate of change when the elevator car is to decelerate and stop at a target floor, means providing a slowdown speed pattern, means providing a deceleration sig- nal indicative of the rate of change which the slowdown speed pattern should follow while it is controlling the speed of the elevator car, and transfer means responsive to the running speed pattern and to said deceleration signal, transferring speed control of said elevator car from said running speed pattern to said slowdown speed pattern, and terminating such control by the running speed pattern, when the rate of change of the running speed pattern has a predetermined relationship with the rate of change signified by said deceleration signal.

2. The elevator system of claim 1 wherein the predetermined relationship which initiates pattern transfer is equality.

3. The elevator system of claim 1 wherein the slowdown speed pattern is provided before pattern transfer, and including means forcing the slowdown speed pattern to follow the running speed pattern prior to pattern transfer.

4. The elevator system of claim 1 wherein the running speed pattern is time based and the slowdown speed pattern is distance based.

5. The elevator system of claim 4 wherein the slowdown speed pattern is initiated a predetermined distance from the target floor.

6. The elevator system of claim 1 wherein the running speed pattern includes an acceleration phase having a predetermined rate of change, and wherein the rate of change of the deceleration signal associated with the slowdown speed pattern is less than said predetermined rate of change of the acceleration phase of the running speed pattern.

7. The elevator system of claim 1 including a floor selector which provides a slowdown signal when the target floor has been selected, with said slowdown signal (a) initiating the slowdown phase of the running speed pattern, (b) initiating the slowdown speed pattern, and (c) enabling pattern transfer.

8. The elevator system of claim 1 wherein the running speed pattern increases its rate of change when the elevator car is to decelerate, until the rate of change reaches a predetermined maximum value, with the transfer means transferring to the slowdown speed pattern when said predetermined maximum rate of change is reached, if transfer has not already taken place due to the occurrence of the predetermined relationship between the rate of change of the running speed pattern and the rate of change signified by the deceleration signal associated with the slowdown speed pattern.

9. The elevator system of claim 8 wherein the transfer means includes comparator means which compares a signal D responsive to the rate of change of the running speed pattern with a reference signal R indicative of the predetermined maximum value, with the occurrence of the predetermined relationship causing a reduction in the magnitude of said reference signal R, and wherein a change in the output of said comparator means initiates pattern transfer.

10. An elevator system, comprising:
a structure having a plurality of floors,
an elevator car mounted for movement in said structure to serve the floors,
motive means for causing said elevator car to make a run and stop at a target floor,
and control means for said motive means, including speed pattern means for providing a speed pattern indicative of the desired speed of the elevator car during at least a portion of a run,
said speed pattern means including first means providing a running speed pattern which controls the speed of the elevator car up to a pattern transfer point, second means providing a slowdown speed pattern after a target floor has been selected, but prior to said pattern transfer point, third means forcing the velocity magnitude of said slowdown speed pattern to match the velocity magnitude of said running speed pattern prior to the pattern transfer point, fourth and fifth means providing first and second deceleration signals, respectively, responsive to the deceleration rates of said running speed pattern and the deceleration rate to be followed by said slowdown speed pattern after pattern transfer, respectively,
comparator means responsive to the first and second deceleration rate signals, with said comparator means providing an equality signal when the deceleration rate of the running speed pattern equals the deceleration of the slowdown speed pattern,
and sixth means responsive to the issuance of said equality signal for transferring speed control of the elevator car from the running speed pattern to the slowdown speed pattern.

* * * * *